United States Patent
Greene et al.

(10) Patent No.: US 10,179,584 B2
(45) Date of Patent: Jan. 15, 2019

(54) PARKING-ASSIST SYSTEM

(71) Applicant: Aptiv Technologies Limited, St. Michael (BB)

(72) Inventors: Jeremy S. Greene, McCordsville, IN (US); Mohamed A. Moawad, Kokomo, IN (US)

(73) Assignee: APTIV TECHNOLOGIES LIMITED (BB)

( * ) Notice: Subject to any disclaimer, the term of this patent is extended or adjusted under 35 U.S.C. 154(b) by 0 days.

(21) Appl. No.: 15/420,158

(22) Filed: Jan. 31, 2017

(65) Prior Publication Data

US 2018/0215375 A1    Aug. 2, 2018

(51) Int. Cl.
*B60W 30/06* (2006.01)
*G05D 1/02* (2006.01)
*G08G 1/14* (2006.01)
*G08G 1/16* (2006.01)

(52) U.S. Cl.
CPC ........... *B60W 30/06* (2013.01); *G05D 1/0257* (2013.01); *G08G 1/14* (2013.01); *G08G 1/143* (2013.01); *G08G 1/166* (2013.01); *G08G 1/168* (2013.01)

(58) Field of Classification Search
CPC ....... B60W 30/06; G05D 1/0257; G08G 1/14; G08G 1/166; G08G 1/168
See application file for complete search history.

(56) References Cited

U.S. PATENT DOCUMENTS

| | | |
|---|---|---|
| 9,522,675 B1 | 12/2016 | You et al. |
| 2005/0122234 A1* | 6/2005 | Danz ...................... B60Q 9/007 340/932.2 |
| 2006/0235590 A1 | 10/2006 | Bolourchi et al. |
| 2014/0292542 A1 | 10/2014 | Bruning et al. |
| 2016/0284217 A1 | 9/2016 | Lee et al. |
| 2016/0358474 A1 | 12/2016 | Uppal |

FOREIGN PATENT DOCUMENTS

| | | |
|---|---|---|
| DE | 196 16 447 A1 | 10/1997 |
| DE | 10 2008 004633 A1 | 7/2009 |
| DE | 102015208124 A1 | 10/2016 |

* cited by examiner

*Primary Examiner* — Basil T. Jos
(74) *Attorney, Agent, or Firm* — Lawrence D. Hazelton

(57) ABSTRACT

A parking-assist system suitable for use on an automated vehicle includes a radar sensor and a controller. The radar-sensor detects a first-vehicle and a second-vehicle adjacent to a travel-path of a host-vehicle. A distance between the first-vehicle and the second-vehicle defines a parking-space. The controller is in communication with the radar-sensor. The controller determines the distance before the host-vehicle enters a zone of the travel-path adjacent to the parking-space. The zone has a length determined by the distance, and the controller determines when the parking-space is large enough to accommodate the host-vehicle based on the distance.

5 Claims, 5 Drawing Sheets

PARKING-ASSIST SYSTEM

TECHNICAL FIELD OF INVENTION

This disclosure generally relates to a parking-assist system for an automated vehicle, and more particularly relates to a parking-assist system that determines when a parking-space will accommodate a host-vehicle.

BACKGROUND OF INVENTION

It is known to use proximity-sensors, such as ultrasonic-sensors, to determine whether a parking-space will accommodate a host-vehicle. For a typical automated parallel-parking maneuver, the rear-end of the host-vehicle must be positioned forward of the open parking-space to allow the proximity-sensor to detect a corner of a parked-vehicle adjacent to the host-vehicle. This positioning may allow following-traffic to encroach on the zone adjacent to the open parking-space preventing the host-vehicle from executing the parking-maneuver.

SUMMARY OF THE INVENTION

In accordance with one embodiment, a parking-assist system suitable for use on an automated vehicle is provided. The parking-assist system includes a radar-sensor and a controller. The radar-sensor detects a first-vehicle and a second-vehicle adjacent to a travel-path of a host-vehicle. A distance between the first-vehicle and the second-vehicle defines a parking-space. The controller is in communication with the radar-sensor. The controller determines the distance before the host-vehicle enters a zone of the travel-path adjacent to the parking-space. The zone has a length determined by the distance, and the controller determines when the parking-space is large enough to accommodate the host-vehicle based on the distance.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
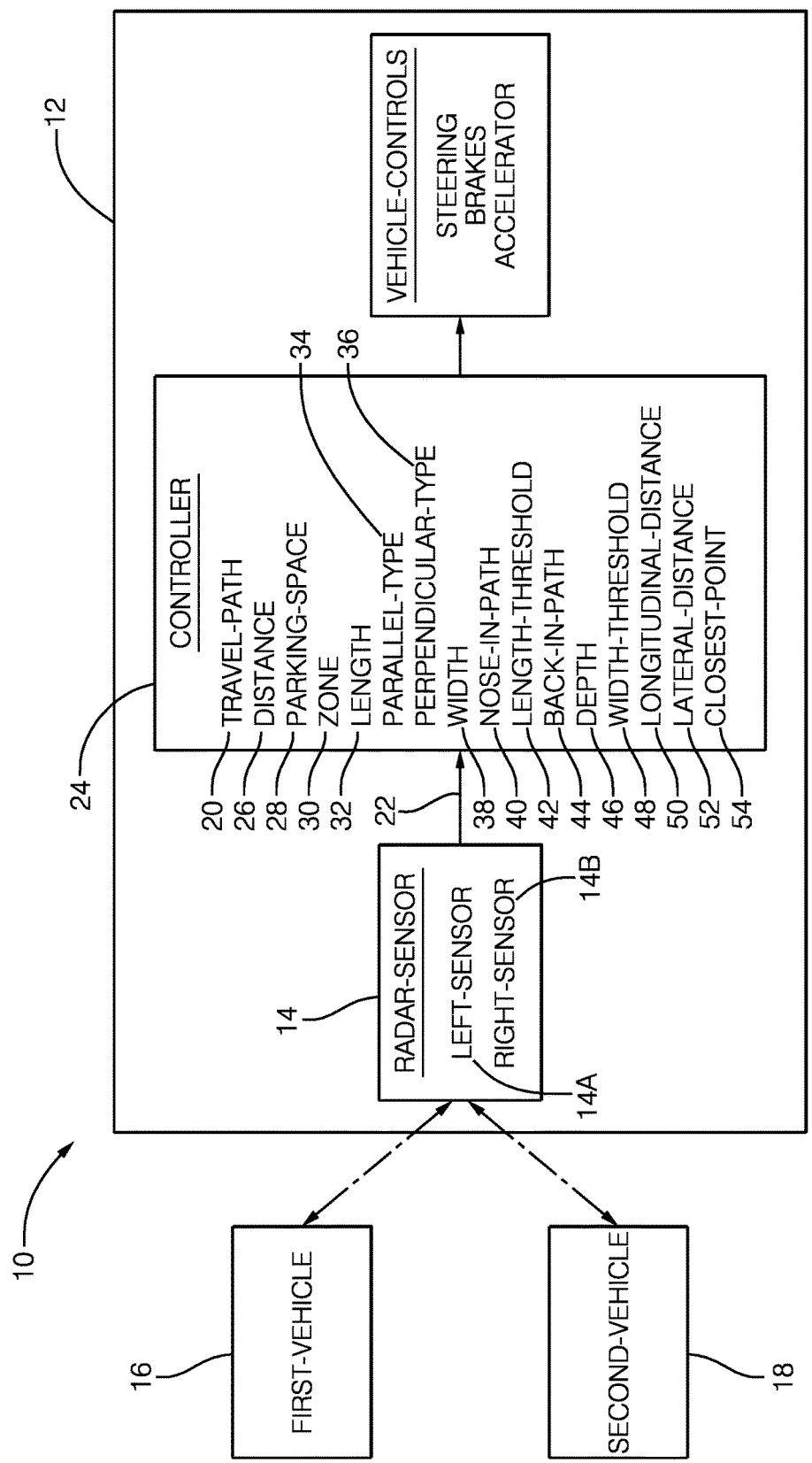
FIG. 1 is an illustration of a parking-assist system in accordance with one embodiment.

FIG. 1 illustrates a non-limiting example of a parking-assist system 10, hereafter referred to as the system 10, suitable for use on an automated vehicle. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human and the automation is merely providing a lane-keep-assist (LKA) or a lane-centering (LC) to the human, and possibly operating the brakes of the host-vehicle 12 to prevent the host-vehicle 12 from entering a travel-path of an approaching vehicle.

The system 10 includes a radar-sensor 14 that detects a first-vehicle 16 and a second-vehicle 18 adjacent to a travel-path 20 of the host-vehicle 12. The radar-sensor 14 is configured to emit a radar-signal (not specifically shown) toward a defined-area proximate to the host-vehicle 12, and detect a reflected-signal (not specifically shown) arising from the radar-signal being reflected by detected-targets. There will generally be some consistent reflected-signals created from strong-targets (not specifically shown) such as a corner of the first-vehicle 16 and the corner of the second-vehicle 18 or other highly reflective objects such a leading-edge (not specifically shown) of the first-vehicle 16 and the leading-edge of the second-vehicle 18; and some intermittent reflected signals from weak-targets (not specifically shown) such a trailing-edge (not specifically shown) of the first-vehicle 16 and the trailing-edge of the second-vehicle 18, for example. Reflected-signals from the weak-targets may be, for example, a multi-path reflection from under the first-vehicle 16 and/or from under the second-vehicle 18 as the signal bounces between the first-vehicle 16 and/or the second-vehicle 18 and the ground.

In the non-limiting example illustrated in FIG. 1, the radar-sensor 14 includes a left-sensor 14A and a right-sensor 14B. A radar sensor-system with a similarly configured radar-sensor 14 is available from Delphi Inc. of Troy, Mich., USA and marketed as an Electronically Scanning Radar (ESR) or a Rear-Side-Detection-System (RSDS) or a Short Range Radar (SRR). It is contemplated that the teachings presented herein are applicable to radar-systems with one or more sensor devices, including, but not limited to, sensor devices mounted to a rear-end (not specifically shown) of the host-vehicle 12.

By way of example and not limitation, the radar-sensor 14 may be configured to output a continuous or periodic data stream that includes a variety of signal characteristics associated with each target detected. The signal characteristics may include, but are not limited to a range (not shown) to the detected-target from the host-vehicle 12, a target-angle (not shown) to the detected-target relative to the host-vehicle-longitudinal-axis (not shown), an amplitude (not shown) of the reflected-signal, and a relative-velocity (not shown) of closure relative to the detected-target. A target is generally detected because the reflected-signal from the detected-target has sufficient signal strength to meet some predetermined threshold. That is, there may be targets that reflect the radar-signal, but the strength of the reflected-signal is insufficient to be characterized as one of the detected-targets.

Figure 2:
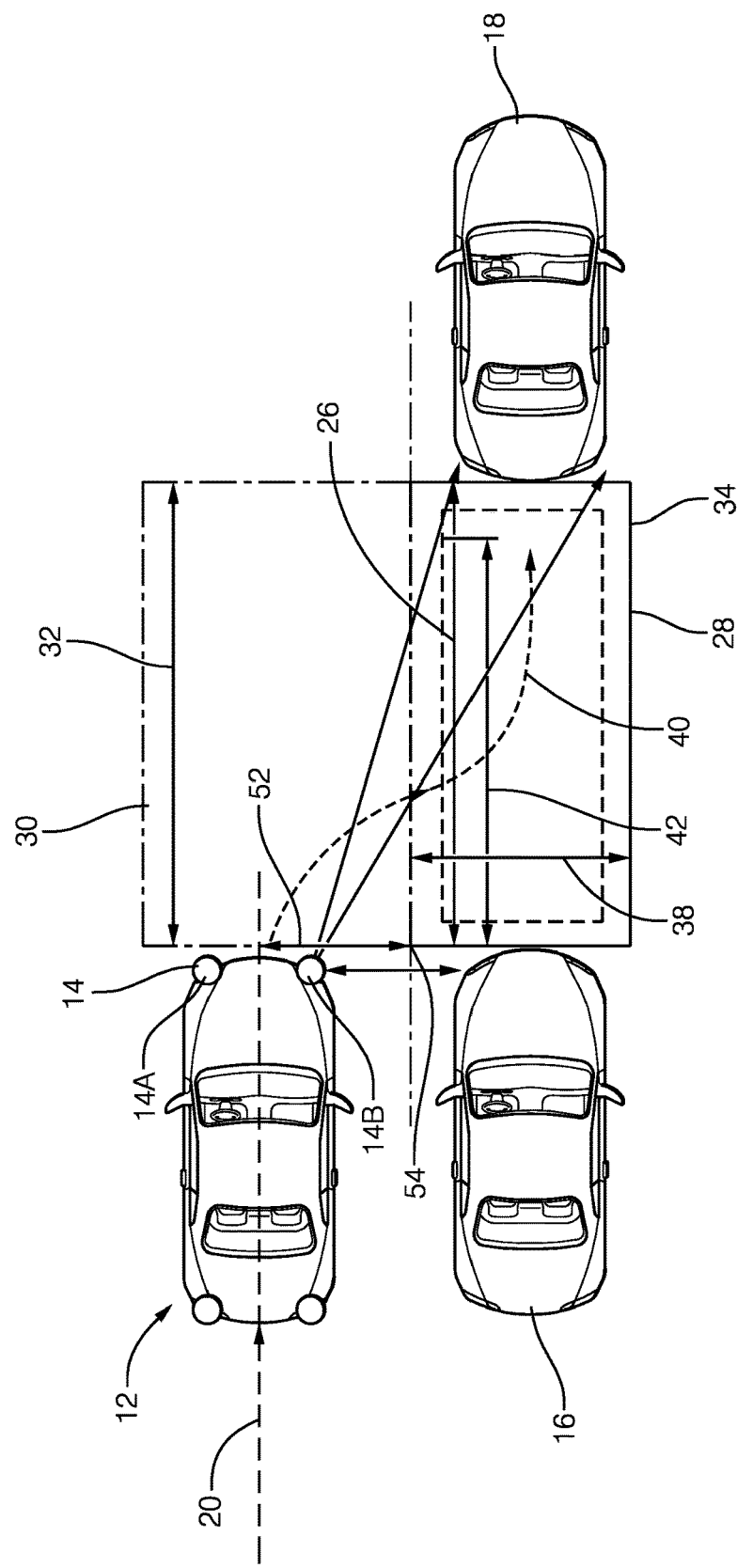
FIG. 2 is an illustration of the parking-assist system from FIG. 1 installed on a host-vehicle in accordance with one embodiment.

The system 10 also includes a controller 24 (FIG. 1) in communication with the radar-sensor 14. The controller 24 may determine a distance 26 between the first-vehicle 16 and the second-vehicle 18 that defines a parking-space 28 based on a reflection-signal 22. As illustrated in FIG. 2, the controller 24 may determine the distance 26 before the host-vehicle 12 enters a zone 30 of the travel-path 20 adjacent to the parking-space 28 where the zone 30 has a length 32 determined by the distance 26. In the non-limiting example illustrated in FIG. 2, the radar-sensor 14 may detect targets at ranges up to fifteen-meters (15-meters) and the controller 24 may determine the parking-space 28 at any point prior to entering the zone 30 once the targets are detected. The controller 24 may continue to update the distance 26 as the host-vehicle 12 approaches the zone 30 enabling the radar-sensor 14 to acquire additional strong-targets.

The controller 24 may include a processor (not shown) such as a microprocessor or other control circuitry such as analog and/or digital control circuitry including an application specific integrated circuit (ASIC) for processing data as should be evident to those in the art. The controller 24 may include memory, including non-volatile memory, such as electrically erasable programmable read-only memory (EEPROM) for storing one or more routines, thresholds and captured data. The one or more routines may be executed by the processor to perform steps for determining if signals received by the controller 24 indicate the presence of objects as described herein. The controller 24 may also be configured to receive host-vehicle 12 related data such as yaw-rate (not shown), yaw-angle (not shown), vehicle-speed (not shown), and transmission gear (not shown). The controller 24 may also be configured to control the host-vehicle's 12 steering, brakes, and accelerator to perform an automated parking-maneuver. The controller 24 may also be configured to store in the memory data related to the dimensions of host-vehicle 12 that include, but are not limited to, a host-vehicle-length (not shown), a host-vehicle-width (not shown), a host-vehicle-height (not shown), a minimum turning-radius (not shown), and a wheel-to-bumper dimension (not shown).

The controller 24 may also determine when the parking-space 28 is large enough to accommodate the host-vehicle 12 based on the distance 26 and the physical dimensions of the host-vehicle 12. Typically for a parallel parking-maneuver, the parking-space 28 may accommodate the host-vehicle 12 when the distance 26 is greater than the host-vehicle-length by a factor μ. The factor μ is may be defined by the equation:

$$\mu = \sqrt{2RW + (L-l1)^2} - L$$

where R is the minimum turning-radius, W is the host-vehicle-width, L is the host-vehicle-length, and l1 is a perpendicular-dimension from a rear-bumper (not specifically shown) of the host-vehicle 12 to a center of a rear-axle (not shown) of the host-vehicle 12. The controller 24 may include a clearance (not shown) between the host-vehicle 12 and the first-vehicle 16 and/or between the host-vehicle 12 and the second-vehicle 18 to allow for door-opening (not shown). When the parking-space 28 is determined by the controller 24 to accommodate the host-vehicle 12, the controller 24 may automatically position the host-vehicle 12 for the parking-maneuver based on a characterization of a type of parking-space 28 (i.e. a parallel-type 34 or a perpendicular-type 36) and based on the minimum turning-radius of the host-vehicle 12. The controller 24 may automatically position the host-vehicle 12 for the parking-maneuver before the host-vehicle 12 is reaches the zone 30 to prevent following-traffic (not shown) from encroaching on the zone 30 and preventing the host-vehicle 12 from performing the selected parking-maneuver. It will be understood by those in the art that the controller 24 may determine that the parking-space 28 is large enough to accommodate the host-vehicle 12 when the second-vehicle 18 is not detected by the radar-sensor 14, as would be the case when multiple parking-spaces 28 are adjacent to one another and the second-vehicle 18 is beyond a detection-range of the radar-sensor 14.

The controller 24 may determine that the parking-space 28 is the parallel-type 34 based on the distance 26 and a width 38 of the parking-space 28. The width 38 may be based on the reflection-signal 22 from the radar-sensor 14 and may be determined before the host-vehicle 12 enters the zone 30 of the travel-path 20 adjacent to the parking-space 28. In the non-limiting example illustrated in FIG. 2, the radar-sensor 14 may detect targets at ranges up to 15-meters and the controller 24 may determine the width 38 at any point prior to entering the zone 30 once the targets are detected. The controller 24 may continue to update the width 38 as the host-vehicle 12 approaches the zone 30 enabling the radar-sensor 14 to acquire additional strong-targets. The controller 24 may further select the parking-maneuver that is a nose-in-path 40 when the distance 26 is greater than a length-threshold 42. In the non-limiting example illustrated in FIG. 2 the length-threshold 42 for the nose-in-path 40 may be determined by the controller 24 based on the minimum turning-radius, the yaw-angle, and the host-vehicle-length, as will be apparent to those skilled in the art. The length-threshold 42 for the host-vehicle 12 may be determined by the following formula:

$$\varepsilon = R^* \sin(\psi) + L$$

where ψ is a required-yaw-angle necessary to steer the host-vehicle 12 into the parking-space 28, R is the minimum turning-radius, and L is the host-vehicle-length. Preferably, an initial-yaw-angle $\psi_o$ of the host-vehicle 12 is less than +/−two-degrees from a line (not shown) parallel to a longitudinal-axis (not shown) of the parking-space 28 for optimal positioning of the host-vehicle 12 at the start of the nose-in-path 40 parking-maneuver.

Figure 3:
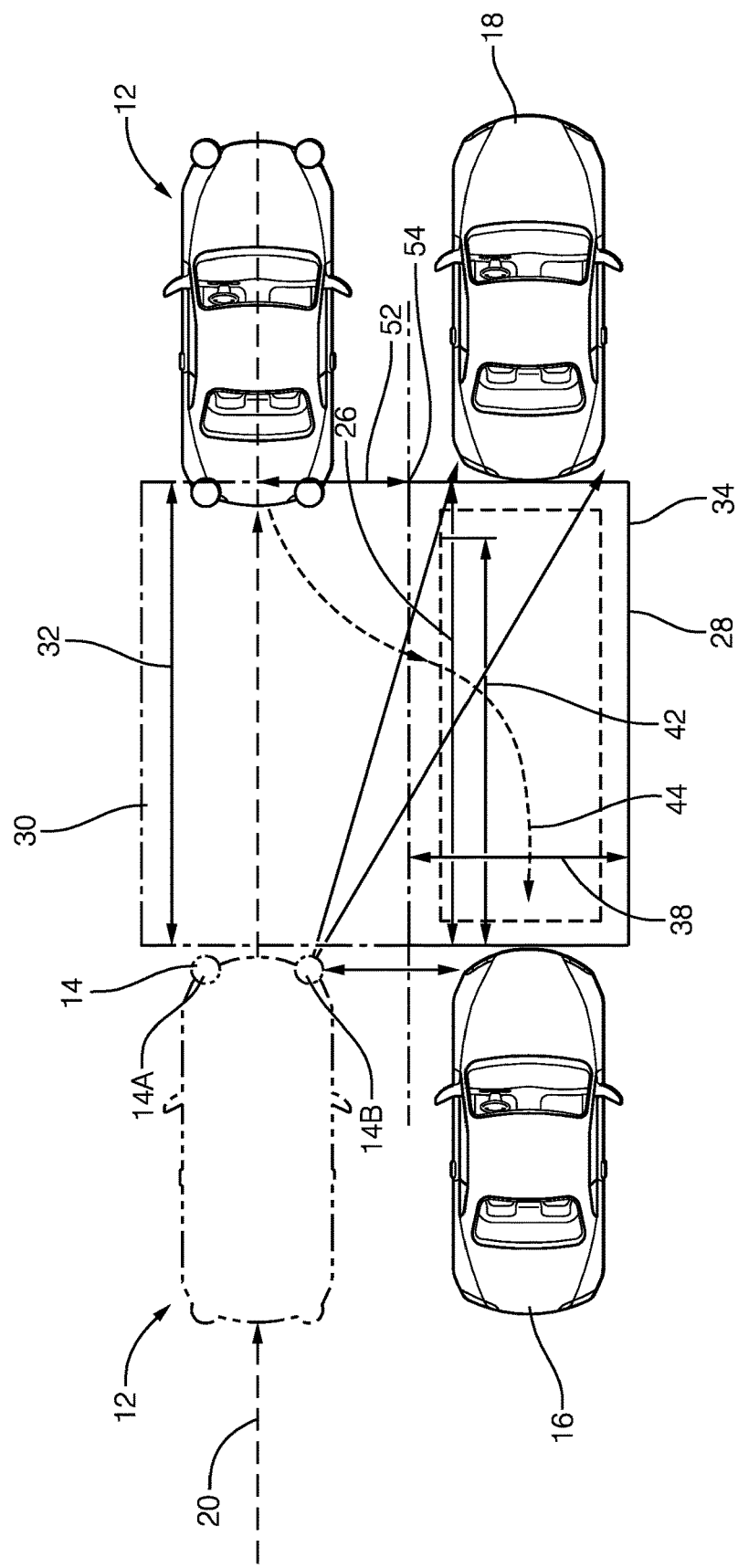
FIG. 3 is an illustration of the parking-assist system from FIG. 1 installed on a host-vehicle in accordance with one embodiment.

The controller 24 may also select the parking-maneuver that is a back-in-path 44 when the distance is less than the length-threshold 42, as illustrated in FIG. 3.

Figure 4:
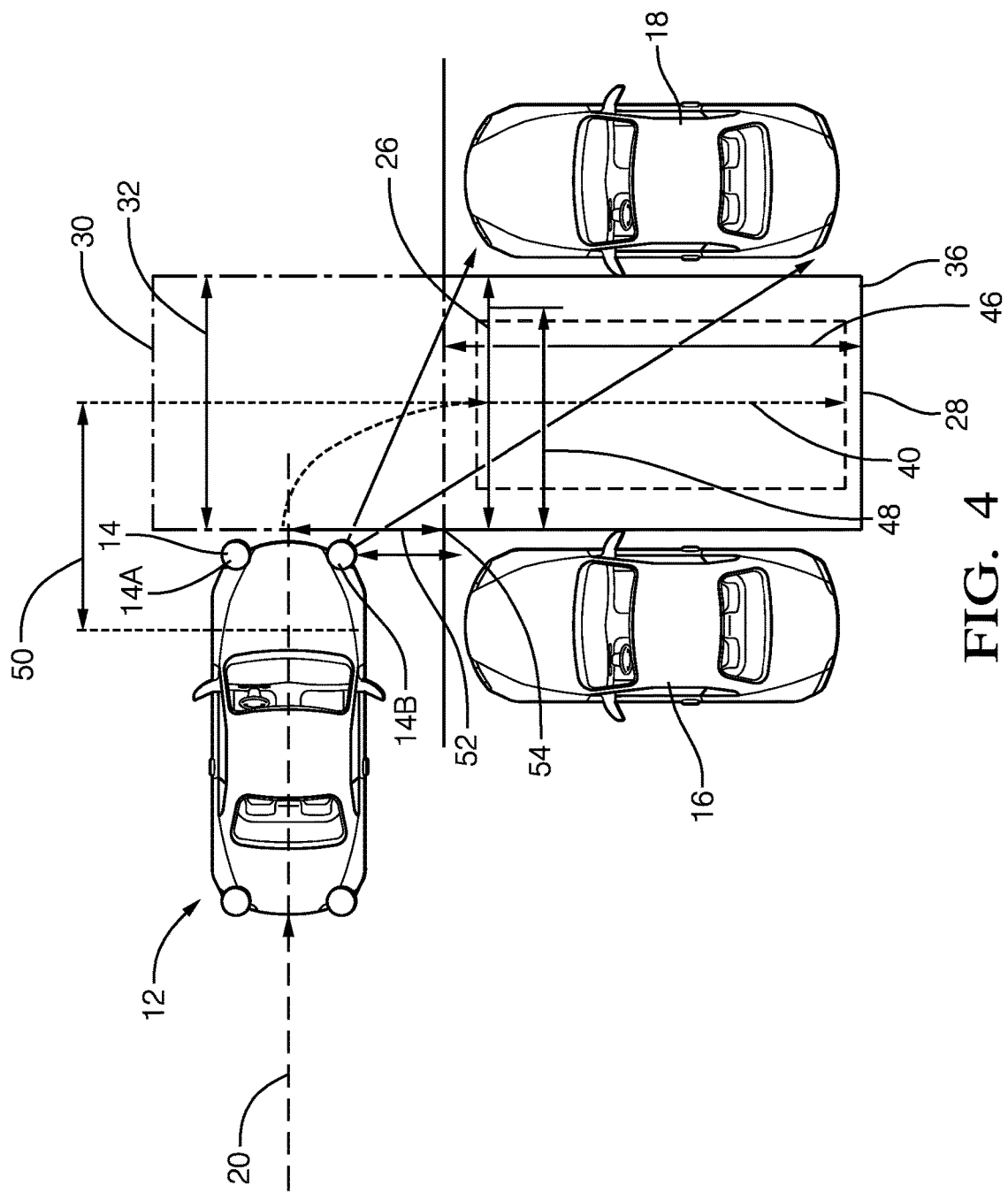
FIG. 4 is an illustration of the parking-assist system from FIG. 1 installed on a host-vehicle in accordance with one embodiment.

As illustrated in FIG. 4, the controller 24 may determine that the parking-space 28 is the perpendicular-type 36 based on the distance 26 and a depth 46 of the parking-space 28. The depth 46 may be based on the reflection-signal 22 from the radar-sensor 14 and may be determined before the host-vehicle 12 enters the zone 30 of the travel-path 20 adjacent to the parking-space 28. In the non-limiting example illustrated in FIG. 4, the radar-sensor 14 may detect targets at ranges up to 15-meters and the controller 24 may determine the depth 46 at any point prior to entering the zone 30 once the targets are detected. The controller 24 may continue to update the depth 46 as the host-vehicle 12 approaches the zone 30 enabling the radar-sensor 14 to acquire additional strong-targets. The controller 24 may further select the parking-maneuver that is the nose-in-path 40 when the distance 26 is greater than a width-threshold 48. In the non-limiting example illustrated in FIG. 4, the width-threshold 48 for the nose-in-path 40 may be 1-meter greater than the host-vehicle-width, and the host-vehicle 12 is positioned such that a longitudinal-distance 50 from a center of a leading-axle (not specifically shown) to a center-line (not specifically shown) of the parking-space 28 is greater than or equal to the minimum turning-radius R, and a lateral-distance 52 from a longitudinal-center-line (not specifically shown) of the host-vehicle 12 to a closest-point 54 of the detected parking-space 28 is greater than or equal to the minimum turning-radius R.

Figure 5:
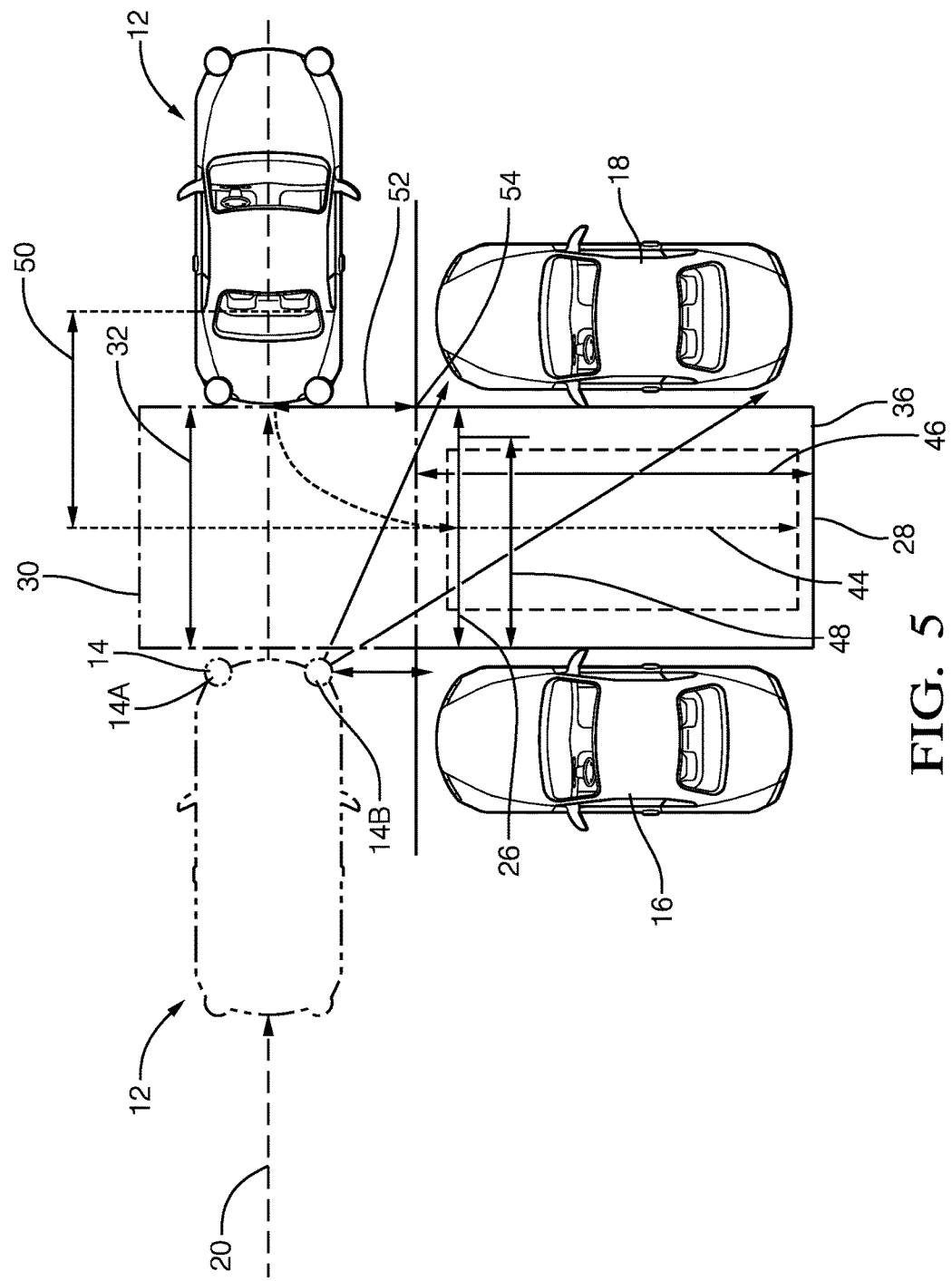
FIG. 5 is an illustration of the parking-assist system from FIG. 1 installed on a host-vehicle in accordance with one embodiment.

As illustrated in FIG. 5, the controller 24 may also select the parking-maneuver that is a back-in-path 44 when the distance 26 is less than the width-threshold 48 (i.e. less than 1-meter greater than the host-vehicle-width), and the host-vehicle 12 is positioned such that a longitudinal-distance 50 from the center of the leading-axle (not specifically shown) to the center-line (not specifically shown) of the parking-space 28 is greater than or equal to the minimum turning-radius R, and a lateral-distance 52 from the longitudinal-center-line (not specifically shown) of the host-vehicle 12 to the closest-point 54 of the detected parking-space 28 is greater than or equal to the minimum turning-radius R.

Accordingly, a parking-assist system 10, and a controller 24 for the parking-assist system 10 is provided. The parking-assist system 10 enables the early detection of the parking-space 28 that will accommodate the host-vehicle 12 prior to the host-vehicle's 12 arrival at the parking-space 28. The parking-assist system 10 is beneficial because it positions the host-vehicle 12 to perform the selected parking-maneuver before the host vehicle 12 passes the parking-space 28 to prevent following-traffic from encroaching on the zone 30 adjacent to the parking-space 28.

While this invention has been described in terms of the preferred embodiments thereof, it is not intended to be so limited, but rather only to the extent set forth in the claims that follow. Moreover, the use of the terms first, second, upper, lower, etc. does not denote any order of importance, location, or orientation, but rather the terms first, second, etc. are used to distinguish one element from another. Furthermore, the use of the terms a, an, etc. do not denote a limitation of quantity, but rather denote the presence of at least one of the referenced items.

We claim:

1. A parking-assist system suitable for use on an automated vehicle, said system comprising:
    a radar-sensor that detects a first-vehicle and a second-vehicle adjacent to a travel-path of a host-vehicle, wherein a distance between the first-vehicle and the second-vehicle defines a parking-space; and
    a controller in communication with the radar-sensor, wherein the controller determines the distance before the host-vehicle enters a zone of the travel-path adjacent to the parking-space, said zone having a length determined by the distance, and wherein the controller determines when the parking-space is large enough to accommodate the host-vehicle based on the distance.

2. The parking-assist system in accordance with claim 1, wherein the controller further determines that the parking-space is a parallel-type of parking-space based on the distance and a width of the parking-space, and selects a nose-in-path to the parking-space when the distance is greater than a length-threshold.

3. The parking-assist system in accordance with claim 1, wherein the controller further determines that the parking-space is a parallel-type of parking-space based on the distance and a width of the parking-space, and selects a back-in-path to the parking-space when the distance is less than a length-threshold.

4. The parking-assist system in accordance with claim 1, wherein the controller further determines that the parking-space is a perpendicular-type of parking-space based on the distance and a depth of the parking-space, and selects a nose-in path to the parking-space when the distance is greater than a width-threshold.

5. The parking-assist system in accordance with claim 1, wherein the controller further determines that the parking-space is a perpendicular-type of parking-space based on the distance and a depth of the parking-space, and selects a back-in path to the parking-space when the distance is less than a width-threshold.

\* \* \* \* \*